(12) United States Patent
Nelson

(10) Patent No.: US 11,607,049 B2
(45) Date of Patent: Mar. 21, 2023

(54) ILLUMINATED SEAT PANEL

(71) Applicant: Century Plastics, LLC, Shelby Township, MI (US)

(72) Inventor: Jeffery M. Nelson, Imlay City, MI (US)

(73) Assignee: Century Plastics, LLC, Shelby Township, MI (US)

( * ) Notice: Subject to any disclaimer, the term of this patent is extended or adjusted under 35 U.S.C. 154(b) by 362 days.

(21) Appl. No.: 16/800,561

(22) Filed: Feb. 25, 2020

(65) Prior Publication Data
US 2020/0297119 A1    Sep. 24, 2020

Related U.S. Application Data

(60) Provisional application No. 62/820,999, filed on Mar. 20, 2019.

(51) Int. Cl.
| | | |
|---|---|---|
| *A47C 7/72* | (2006.01) |
| *B64D 11/04* | (2006.01) |
| *B60Q 3/233* | (2017.01) |
| *F21V 23/04* | (2006.01) |
| *F21W 106/00* | (2018.01) |
| *B60N 2/20* | (2006.01) |

(Continued)

(52) U.S. Cl.
CPC .............. *A47C 7/725* (2013.01); *B60Q 3/233* (2017.02); *F21V 23/0485* (2013.01); *B60N 2/20* (2013.01); *B60N 2002/0264* (2013.01); *B64D 2011/0053* (2013.01); *F21W 2106/00* (2018.01); *F21Y 2115/10* (2016.08)

(58) Field of Classification Search
CPC . A47C 7/725; B60Q 3/233; B64D 2011/0053
See application file for complete search history.

(56) References Cited

U.S. PATENT DOCUMENTS

| | | | | |
|---|---|---|---|---|
| 2,261,698 A | * | 11/1941 | Prance | B60Q 3/275 |
| | | | | 131/234 |
| 2,514,322 A | * | 7/1950 | Flogaus | B60Q 3/233 |
| | | | | 362/483 |

(Continued)

FOREIGN PATENT DOCUMENTS

| | | | | |
|---|---|---|---|---|
| CA | 3055716 A1 | * | 3/2020 | B60N 2/79 |
| DE | 10302986 A1 | * | 8/2004 | B60Q 3/233 |

(Continued)

*Primary Examiner* — Timothy J Brindley
(74) *Attorney, Agent, or Firm* — Quinn IP Law

(57) ABSTRACT

A seat panel for assembly into a rear surface of a seat assembly includes a light assembly which generates task lighting directed to a task area and of sufficient brightness to be useful in performing a task within the task area. The light assembly is selectively actuable to emit light through an aperture defined by the seat panel in a defined light pattern to illuminate a recessed space in the seat panel. The seat assembly when configured as a forward seat assembly of a vehicle provides task lighting for a passenger seated rearward of the forward seat assembly, to illuminate a task area which can include one or more of the exterior surface of the seat panel, a leg space between the forward seat assembly and the passenger's seat assembly, and/or a seat space generally including a portion of the upper leg and/or lap area of the passenger.

17 Claims, 5 Drawing Sheets

(51) Int. Cl.
*F21Y 115/10* (2016.01)
*B60N 2/02* (2006.01)
*B64D 11/00* (2006.01)

(56) References Cited

U.S. PATENT DOCUMENTS

| | | | | |
|---|---|---|---|---|
| 2,619,395 | A * | 11/1952 | Kent | B60N 3/004 |
| | | | | 297/146 |
| 10,065,741 | B1 * | 9/2018 | Pozzi | B64D 11/0627 |
| 2008/0219016 | A1 * | 9/2008 | Koliba | B60Q 3/233 |
| | | | | 362/488 |
| 2011/0174926 | A1 * | 7/2011 | Margis | G06F 1/18 |
| | | | | 725/77 |
| 2012/0139308 | A1 * | 6/2012 | Westerink | B64D 11/06 |
| | | | | 297/217.6 |
| 2015/0296633 | A1 * | 10/2015 | Murata | H05K 5/0217 |
| | | | | 361/679.01 |
| 2019/0328142 | A1 * | 10/2019 | Ma | G02B 6/0078 |

FOREIGN PATENT DOCUMENTS

| | | | | |
|---|---|---|---|---|
| DE | 102005003873 A1 * | 8/2006 | | B64D 11/0015 |
| DE | 202013002220 U1 * | 8/2013 | | B60N 3/004 |
| DE | 102014111894 A1 * | 4/2015 | | B60Q 3/217 |
| DE | 102016108578 A1 * | 11/2016 | | B60N 2/80 |
| DE | 202018103429 U1 * | 8/2018 | | B60N 2/3045 |
| DE | 102018121061 A1 * | 3/2020 | | |
| DE | 102019133186 A1 * | 6/2021 | | |
| EP | 2676843 A1 * | 12/2013 | | B60Q 3/0253 |
| EP | 3064401 A2 * | 9/2016 | | B60Q 3/233 |
| JP | 2010111345 A * | 5/2010 | | B60N 3/004 |
| WO | WO-2006041417 A1 * | 4/2006 | | B60N 2/879 |

* cited by examiner

ILLUMINATED SEAT PANEL

CROSS-REFERENCE TO RELATED APPLICATIONS

This Applications claims the benefit of U.S. Provisional Application 62/820,999 filed Mar. 20, 2019, which is hereby incorporated by reference in its entirety.

TECHNICAL FIELD

The present disclosure relates to a seat panel for a seat assembly, and more particularly, to an illuminated seat panel.

BACKGROUND

Most vehicles include interior lighting for assisting a passenger in performing a task. In many cases, the lighting is positioned overhead relative to a passenger, such that a light pattern provided by the overhead lighting can extend beyond the required task area of the passenger within the vehicle, for example, into the field of vision of a driver of the vehicle. Overhead task lighting can illuminate the interior of the vehicle such that the light is perceptible by drivers of adjacent vehicles, and/or the contents of the vehicle are illuminated for viewing by others outside of the vehicle. In some cases, ambient lighting can be used to illuminate various areas of the vehicle interior, such as the instrument panel, infotainment interfaces, etc., however, this lighting may not be sufficiently bright for use as task lighting and/or may not illuminate the required task area of the vehicle passenger.

SUMMARY

Described herein is a seat panel for assembly into a rear surface of a seat assembly, the seat panel including a light assembly configured to generate task lighting which is directed to a task area and of sufficient brightness to be useful to a passenger within the vehicle in performing a task. The seat panel defines at least one aperture and includes a light assembly which is selectively actuable to emit light through the aperture in a defined light pattern. In one example, the seat panel includes a recessed portion which can contain a pocket assembly, and the light assembly and aperture are configured such that the light emitted by the light assembly through the aperture illuminates the recessed space, including a pocket defined by the pocket assembly, for the convenience of a user looking to locate items in the pocket. In one example, the seat assembly is a forward seat assembly of a vehicle, such that the light assembly provides task lighting for a passenger seated rearward of the forward seat assembly, where the light pattern can be configured to illuminate a task area which can include one or more of the exterior surface of the seat panel, a leg space between the forward seat assembly and the passenger's seat assembly, and/or a seat space generally including a portion of the upper leg and/or lap area of the passenger, such that the illuminated seat panel is advantaged by providing task lighting to the passenger to perform tasks such as accessing the contents of the seat pocket, locating objects on the floor of the vehicle in the leg space, or performing tasks in the passenger's seat space proximate the seat panel. In one example, the light pattern emitted from the lighting assembly is configured such that the light pattern is contained between a plane extending through the aperture and substantially parallel to the vehicle floor, such that the light pattern is not perceptible by a passenger in the forward seat and/or does not substantially illuminate the area above the plane.

In one example, the seat panel includes a perimeter portion, a beveled portion, and a recessed portion which are arranged such that the beveled portion is intermediate the perimeter portion and the recessed portion, where the recessed space is defined by the recessed portion and the beveled portion. In one example, the aperture is located in the beveled portion. In one example, the aperture is located in the recessed portion.

The seat panel can include a switch in communication with the light assembly and selectively actuable to actuate the light assembly. In one example, the switch is a haptic switch which is actuable by contact with the seat panel. The light assembly includes a light source which can include at least one light emitting diode (LED). In one example, the light source includes at least one of a LED bulb, an LED array, an LED strip, and an LED tube.

In an example configuration, the seat panel, in an installed position relative to a mounting surface such as a floor, defines a plane extending through the at least one aperture, where the plane is substantially parallel to the mounting surface, and where the light pattern emitted via the aperture is contained between the plane and the mounting surface. The plane, for example, can include and/or pass through an uppermost edge of the aperture.

The seat panel can further include a control unit in communication with the light assembly, where the control unit is actuable to actuate the light assembly to emit the light pattern. In one example, the control unit is configured to receive power at a first voltage level from a power source and to output power at a second voltage level to the light assembly.

In one example, the seat panel is installed to a vehicle which includes a network in communication with a power source. In this example, the control unit is in communication with the network to receive power from the power source to actuate the light assembly. In one example, the vehicle includes a control interface located remotely from the seat panel and in communication with the control unit via the network, configured such that the control interface is actuable to actuate the light assembly.

In one example, the seat panel is installed to a rearward side of a forward seat assembly of a vehicle, where the vehicle includes a rearward seat assembly positioned rearward of the forward seat assembly to define a leg space therebetween, such that the light pattern emitted via the aperture in the seat panel illuminates the leg space. In this example, the rearward seat assembly defines a seat space and the light pattern as emitted via the aperture at least partially illuminates the seat space. The forward seat assembly can include a seat back and a seat portion, with the seat panel is installed to seat back, and can be mounted to a floor of the vehicle such that the seat back is moveable between a first incline angle and a second incline angle. In one example, with the seat back in the first incline angle the light pattern is contained between a plane and the floor of the vehicle, where the plane is substantially parallel to the floor and extends through the at least one aperture. In one example, the seat panel includes a pocket portion attached to the seat panel. where the pocket portion at least partially encloses the recessed space to define a pocket such that the light pattern at least partially illuminates the pocket.

The above features and advantages, and other features and advantages, of the present teachings are readily apparent from the following detailed description of some of the best

DETAILED DESCRIPTION

Figure 1:
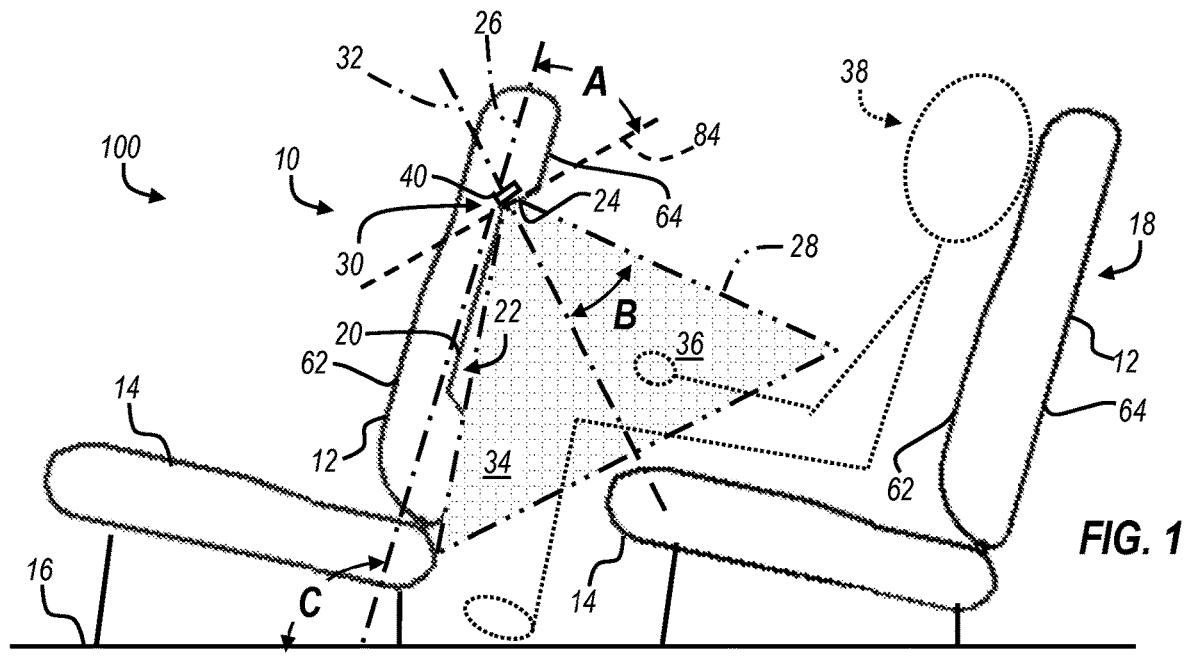
FIG. 1 is a schematic side view of a forward seat assembly and a rearward seat assembly positioned in a vehicle, showing a sectional view of section 5-5 of FIG. 3 and including an illuminated seat panel installed to a rearward side of a seat back of the forward seat assembly.
Figure 4:
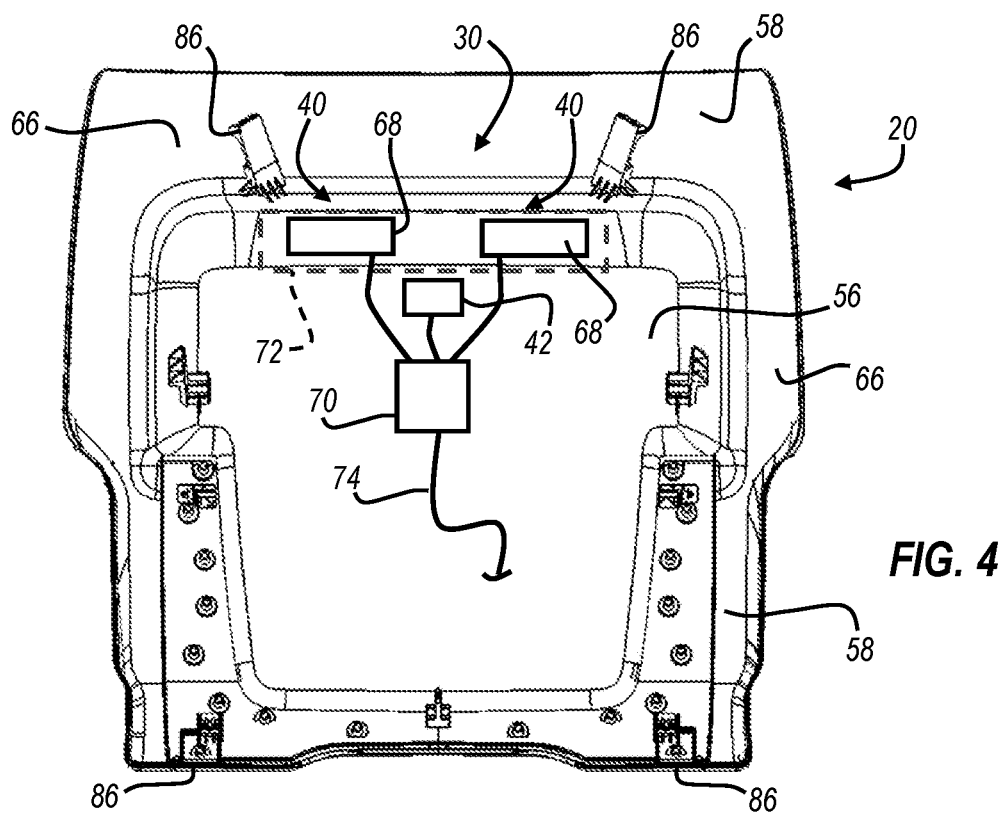
FIG. 4 is a schematic view of the interior side of the example illuminated seat panel of FIG. 3.
Figure 5:
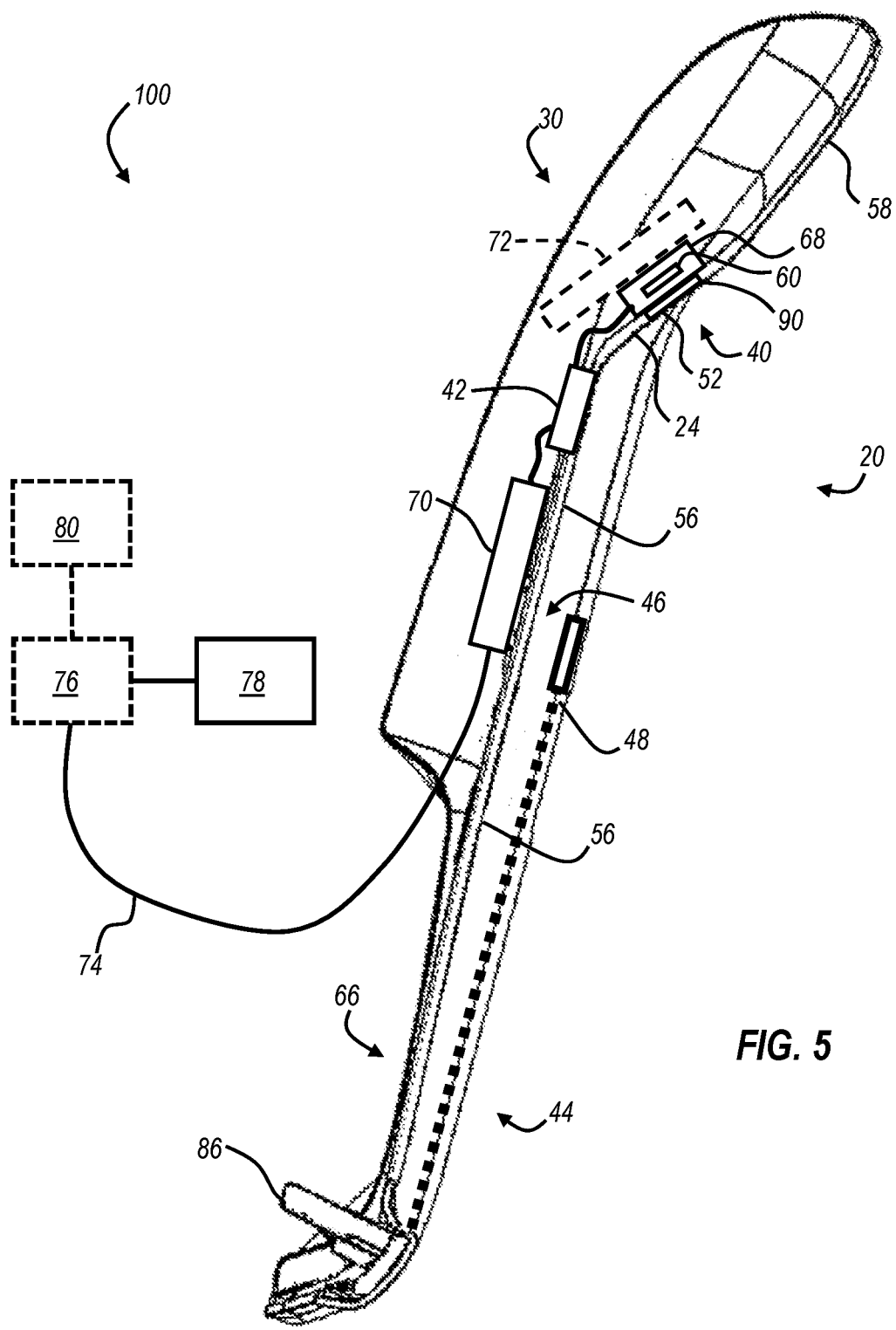
FIG. 5 is a sectional view of section 5-5 of the example illuminated seat panel of FIG. 3.
Figure 6:
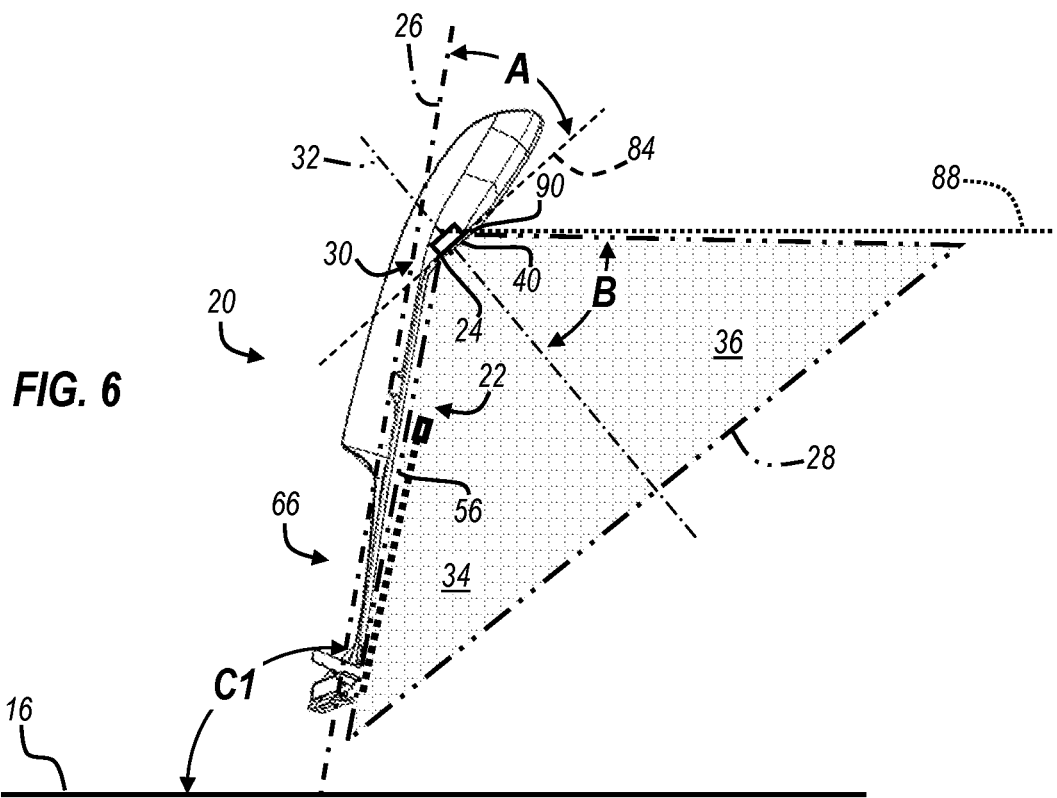
FIG. 6 is a sectional view of section 5-5 of the illuminated seat panel of FIG. 1, in a first inclined position.
Figure 7:
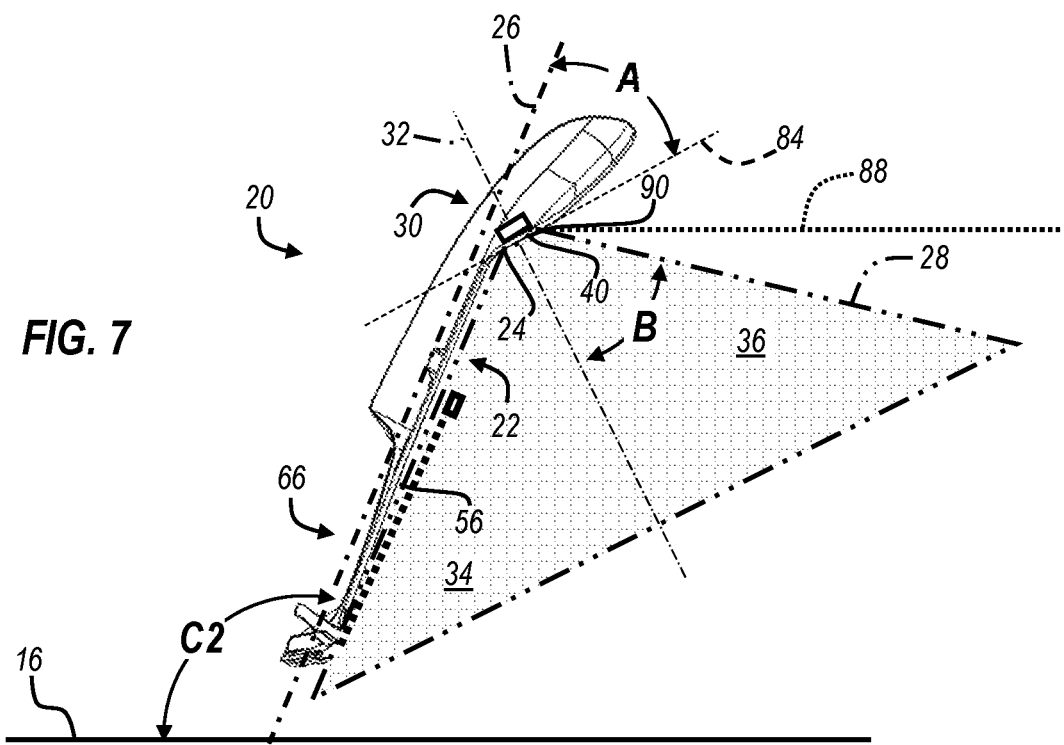
FIG. 7 is a sectional view of section 5-5 of the illuminated seat panel of FIG. 1, in a second inclined position.

The elements of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. Referring to the drawings wherein like reference numbers represent like components throughout the several figures, the elements shown in FIGS. 1-9 are not necessarily to scale or proportion. Accordingly, the particular dimensions and applications provided in the drawings presented herein are not to be considered limiting. The following listing of elements shown in FIGS. 1-9 is provided for reference only, and is not intended to be limiting:

- 100 Vehicle
- 10 Seat assembly (forward)
- 12 Seat back
- 14 Seat portion
- 16 Mounting surface, floor
- 18 Seat assembly (rearward)
- 20 Seat panel
- 22 Recessed space
- 24 Beveled portion
- 26 Central axis of seat back
- 28 Light pattern
- 30 Lighting module
- 32 Pattern axis
- 34 Leg space, floor space
- 36 Task space, seat space
- 38 Passenger
- 40 Light assembly
- 42 Light switch
- 44 Exterior side of seat panel
- 48 Pocket portion
- 50 Aperture
- 52 Diffuser lens
- 54 Bezel
- 56 Recessed portion
- 58 Perimeter portion
- 60 Light source (LED)
- 62 Forward side of seat back
- 64 Rearward side of seat back
- 66 Interior side of seat panel
- 68 Housing
- 70 Control unit
- 72 Assembly cover
- 74 Connector/wiring harness
- 76 Network/vehicle bus
- 78 Power source
- 80 Control interface
- 82 Channel
- 84 Bevel plane
- 86 Fastener
- 88 Reference plane
- 90 Uppermost edge of aperture
- A Bevel angle
- B Beam angle
- C Incline angle Referring to FIGS. 1-9, wherein like reference numbers represent like components throughout the several figures, FIG. 1 shows, in an illustrative example, a vehicle 100 including a plurality of seat assemblies 10, 18 positioned on a mounting surface 16 of the vehicle 100 such that the seat assembly 10 is forward of the seat assembly 18. For illustrative purposes, the seat assembly 10 can be referred to herein as the forward seat assembly and the seat assembly 18 can be referred to herein as the rearward seat assembly. In the present example, the mounting surface 16 is a floor of the vehicle 100, and the forward and rearward seat assemblies are connected to the floor 16 to define a leg space 34 between the forward seat assembly 10 and the seat portion 14 of the rearward seat assembly 18, as shown in FIG. 1. The leg space 34 can include a portion of the floor 16 disposed between the forward and rearward seat assemblies 10, 18, such that the leg space 34 can also be referred to herein as a floor space 34. Each of the seat assemblies 10, 18 include a seat back 12 and a seat portion 14 which are hingedly connected to each other such that the seat back 12 can be selectively inclined relative to the seat portion 14 and relative to the floor 16 at an incline angle C defined by a central axis 26 of the seat back 12. In one example, the seat back 12 can be selectively inclined to a position which is between a first incline angle C1 and a second incline angle C2, relative to the floor 16 and central axis 26, as shown in FIGS. 6 and 7. Each seat back 12 includes a forward side 62 and a rearward side 64. In the example shown, a passenger 38 is seated in the rearward seat assembly 18 such that the feet and lower portion of the passenger 38 legs extend into the leg space 34, and such that a passenger task space 36 is defined in the area above the seat portion 14 of the rearward seat assembly 18 which includes the upper portion and lap of the seated passenger 38. As such, the task space 36 includes the area where the passenger 38 may be performing a task such as reading, writing, eating, using a user device such as a phone, computing or gaming device, or other task where illumination is required or preferred. In one example, when the rearward seat 18 is not occupied by a passenger 38, the task space includes the space immediately above and including the seat portion 14, such that, as used herein, the task space 36 may also be referred to as the seat space 36.

The seat back 12 of the forward seat assembly 10 includes a seat panel 20 affixed and/or installed to a rearward side 64 of the seat back 12, such that an exterior side 44 of the seat panel 20 faces a forward side 62 of the rearward seat assembly 18, and an interior side 66 (see FIG. 5) is contained within the seat back 12. The interior side 66 can include one or more fasteners 86 for fastening the seat panel 20 to the seat back 12. The seat panel 20 includes a lighting module generally indicated at 30, including a light assembly 40 configured to emit a light pattern 28 through at least one aperture 50 (see FIG. 2) defined by the seat panel, where the light pattern 28 is emitted rearward and/or downward from the seat panel 20 such that, as shown in FIG. 1, the light pattern 28 illuminates at least a portion of the rearward side 64 and seat panel 20 of the forward seat assembly 10, and illuminates, as shown in the example, the leg space 34 and task space 36 located between the forward and rearward seat assemblies 10, 18. In a non-limiting example, the light pattern 28 emitted from the aperture 50 can be defined by a pattern axis 32 and a beam angle B where the light pattern 28 defines an illuminated space, e.g., the space illuminated by the light emitted from the aperture 50. In one example, the light pattern 28 may be substantially conical, where, depending on the configuration of the aperture 50 and the light assembly 40, the conical shape of the light pattern 28 can be one of a circular cone, an oblique circular cone, and an elliptical cone. The example is non-limiting, such that it would be understood that the lighting module 30 and/or apertures 50 could be configured to emit a light pattern 28 defining an illuminated space characterized by one of a conical, cuboidal, cylindrical, pyramidal, and/or prismal shape, depending on the shape of the light pattern 28 desired, and/or the configuration of one or more of the seat panel 20, the seat assemblies 10, 18, and the vehicle 100.

In a non-limiting example, the seat panel 20 includes a perimeter portion 58, a beveled portion 24, and a recessed portion 56, where the beveled portion 24 is intermediate the perimeter portion 58 and the recessed portion 56, and the recessed portion 56 is offset from the perimeter portion 58 such that the recessed portion 56 and the beveled portion 24 define a recessed space 22 in the seat panel 20. In an installed position, e.g., with the seat panel 20 installed to the seat back 12, a bevel plane 84 defined by the beveled portion 24 can be characterized by a bevel angle A relative to the central axis 26 of the seat back 12, as shown in FIGS. 1, 6 and 7. The seat panel 20 can include a pocket portion 48 configured to define a pocket 46 in the recessed space 22. In one example, the pocket portion 48 can be made of a mesh material as shown in the illustrative figures, or of another material coordinating with and/or matching other materials covering the seat assembly 10 and/or the interior of the vehicle 100. As shown in FIGS. 1, 2, 6 and 7, the light pattern 28 illuminates at least a portion of the rearward side 64 and seat panel 20 of the forward seat assembly 10, such that the light pattern 28 advantageously illuminates the pocket 46 and pocket portion 48, to assist a passenger, for example, in positioning and/or locating items within the pocket 46.

Figure 3:
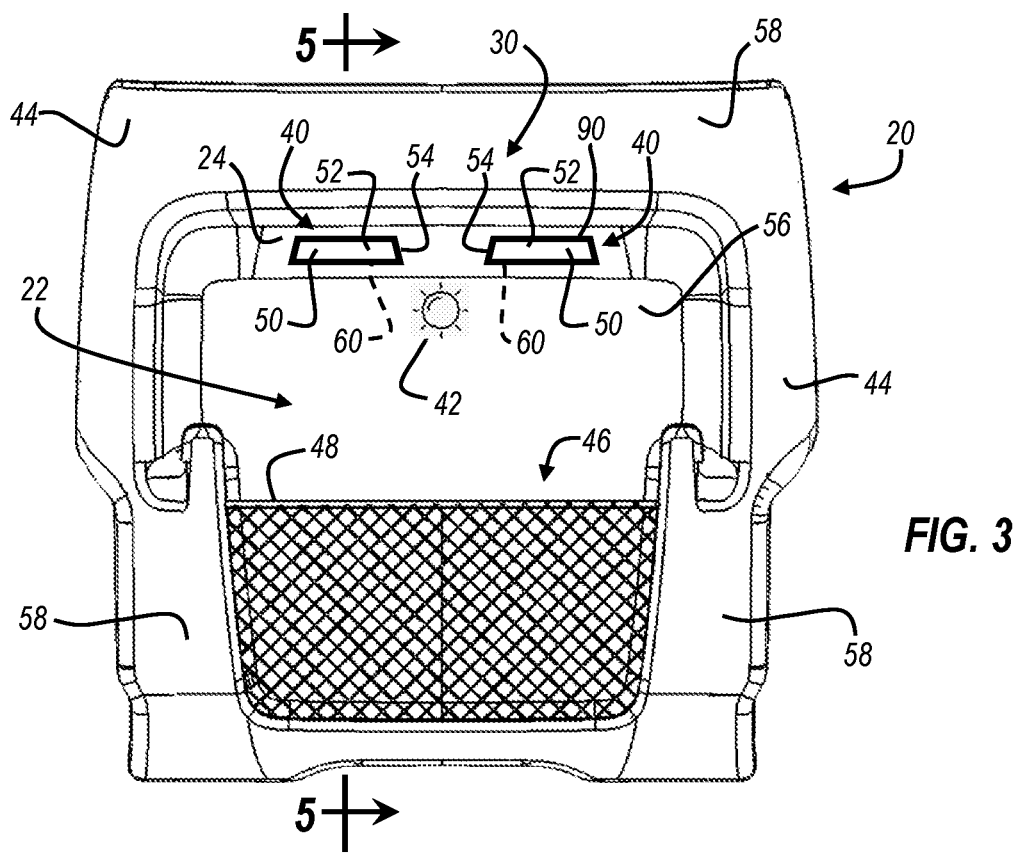
FIG. 3 is a schematic view of an exterior side of the example illuminated seat panel of FIG. 2.

As shown in FIGS. 2-5, the lighting module 30 includes at least one light assembly 40 and at least one light switch 42 for actuating the at least one light assembly 40 to emit light through at least one aperture 50 defined by the seat panel. Each light assembly 40 includes a housing 68, which houses a light source 60. The housing 68 is attachable to the seat panel 20 to position the light source 60 relative to the aperture 50 such that light emitted from the light source 60 via the aperture 50 forms the light pattern 28. In one example, the housing 68 can further include one or more reflectors and/or optical surfaces for reflecting the light emitted from the light source 60, to form the light pattern 28. In one example, a lens 52 is positioned in the housing 68 and/or in the aperture 50, through which light from the light source 60 is emitted. The lens 52 can be configured, shaped, and/or patterned as a diffuser lens to diffuse the light emitted from the light source 60 in a predetermined pattern, shape, brightness, etc., to at least partially define the light pattern 28. In one example, the lens 52 can include one or more of a louver, insert, grid, mullion, etc., for defining the light pattern 28 and/or as decorative trim. In one example, the light assembly 40 and/or the seat panel 20 can include one or more bezels 54 for attaching the light assembly 40 to the seat panel 20 and/or to the aperture 50, and/or as decorative trim. In one example, the bezel 54 and/or the housing 68 can be configured such that the light assembly 40 is repositionable relative to the seat panel 20, for example, such that the light assembly 40 can be rotated or angled relative to the seat panel 20 during installation and/or in use. In one example, the housing 68 can include a heat sink to dissipate heat generated from operation of the light assembly 40 including heat generated by the light source 60. As shown in FIG. 5, the lighting module 30 can include an assembly cover 72 configured to cover one or more of the at least one light assembly 40, the switch 42, and/or the control unit 70, for example, to isolate, cushion, and/or protect these elements from loading and/or vibration transferred through the forward side 62 of the seat back 12 of the forward seat assembly 10, and/or to provide a heat sink to dissipate heat generated by the lighting module 30.

In a non-limiting example, the light source 60 includes at least one light emitting diode (LED). The at least one LED can be configured as a combination of one or more of an LED bulb, an LED array, an LED strip, an LED tube, an LED chip, and/or can include micro LED and/or mini LED elements or a combination of these, by way of non-limiting example. The light source 60 and/or the at least one light emitting diode can be configured to emit light in one or more colors, color temperatures, brightness, patterns, etc. In one example, the light source is configured to be dimmable and/or to emit light in a pattern which can include a combination of one or more of a static light, blinking light, flashing light, alternating patterns or colors of light, varying brightness, varying color temperature, and/or a sequenced progression of one or more of these.

The light source 60 is configured to output a light pattern 28 characterized by a luminous flux (measured in lumens) which is sufficient to provide visible light in the illuminated spaces, e.g., to the pocket 46, floor space 34, and task space 36, to illuminate tasks performed by the passenger 38. The range of luminous flux required can vary depending on the configuration and position of at least one aperture 50, the configuration and position of the at least one lighting assembly 40, the configuration and position of the interior components of the vehicle 100 including the seat assemblies 10, 18, etc. In an illustrative example, the aperture(s) 50 and the lighting module 30 including the light assembly(s) 40, the lenses 52, etc., can be configured to provide a light pattern 28 which is characterized by a luminous flux in a range of 20 to 200 lumens. In one example, the aperture(s) 50 and lighting module 30 is configured to provide a light pattern 28 which is characterized by a luminous flux in a range of 20 to 450 lumens. In one example, the aperture(s) 50 and lighting module 30 is configured to provide a light pattern 28 which is characterized by a luminous flux in a range of 70 to 450 lumens. In one example, the aperture(s) 50 and lighting module 30 is configured to provide a light pattern 28 which is characterized by a luminous flux in a range of 70 to 800 lumens. In the examples shown, it would be understood that a particular range of luminous flux would be selected based on the intended use of the light, e.g., for illumination of the area, which may require a relatively lower range of luminous flux, or to provide task lighting, which may require a relatively higher range of luminous flux, where the range of luminous flux selected may also be affected by the configuration of the space to be illuminated, the aperture pattern and size, etc.

Figure 2:
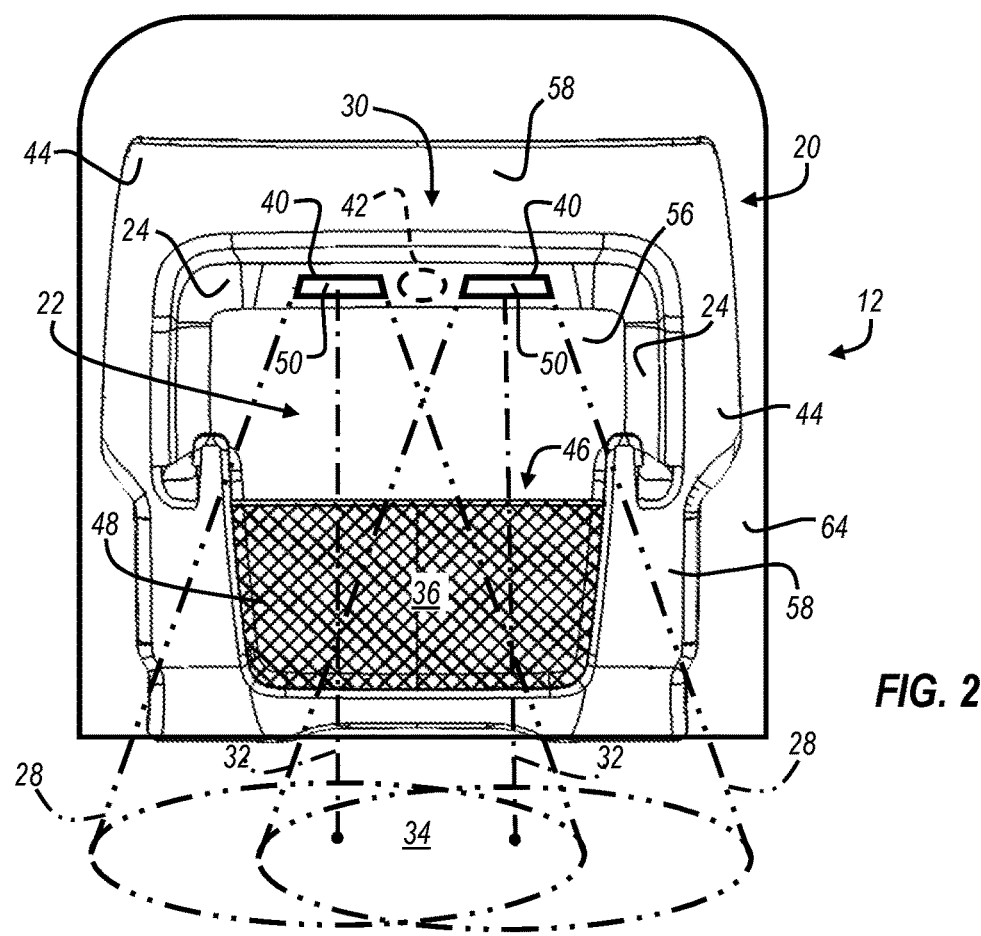
FIG. 2 is a schematic rear view of the forward seat assembly of FIG. 1, showing an example illuminated seat panel installed to the rearward side of the seat back of the forward seat assembly.

In a non-limiting example, the light switch 42 can be located on the seat back 12 such that the light switch 42 is conveniently accessed by a passenger 38 seated in the rearward seat 18. For example, the light switch 42 can be located in and/or on the seat panel 20, in and/or on the light assembly 40, integrated into the bezel 54, etc. In one example, the light switch 42 is configured as a haptic switch actuable by touch input from a user such as a passenger 38. The switch 42 may be positioned on the interior side 66 of the seat panel 20, as shown in FIGS. 2-6, and the position of the haptic switch 42 may be indicated on the exterior side 44 of the seat panel 20 by location (for example, on beveled portion 24 between the apertures 50 as shown in FIG. 2), or by a symbol or marking (for example, on recessed portion 56 as shown in FIG. 3). The light switch 42 can be configured to actuate the lighting module 30, for example, to light one or more of the light assemblies 40, to actuate the at least one light assembly to emit the light pattern 28, and/or to actuate the at least one light assembly 40 to emit a variation of the light pattern 28, including, for example, changing the brightness of the light pattern 28, dimming the light pattern 28, changing the color, lighting sequence (static, blinking, flashing), etc., of the light pattern 28, according to the user's preferences.

As shown on FIGS. 4 and 5, the lighting module 30 can be connected to a power source 78 for powering the at least one light assembly 40 via a connector 74. The lighting module 30 can include a control unit 70 in communication with and connected to the at least one light assembly 40 and the light switch 42. The control unit 70 can be connected to the power source 78 such that the control unit 70 receives power from the power source 78 and outputs power to the at least one light assembly 40 and to the light switch 42. In one example, the control unit 70 is configured to regulate the power supply received from the power source 78 prior to outputting power to the at least one light assembly 40 and to the switch 42. In one example, the control unit 70 includes circuitry to regulate, e.g., step down incoming power in the range of 12 volts (V) to an outgoing power level in the range of 6 volts or less. In one example, the control unit 70 is configured to regulate incoming power such that the power outgoing from the control unit 70 to the light assembly 40 is in the range of 1 to 4 volts. In one example, the connector 74 is connected to a network 76 of a vehicle 100, where the network 76 is configured, for example, as a CAN bus connected to a power source 78 of the vehicle 100, which can be, for example, a battery of the vehicle 100.

The control unit 70 can include one or more algorithms for processing input signals received from the light switch 42 and outputting control signals to the at least one light assembly 40, where the control signals are defined by the input signals received from the light switch 42 and include signals, for example, to actuate the at least one light assembly 40, to deactivate the at least one light assembly 40, and/or to control and/or modify the pattern, color, brightness, etc. of the light emitted from the at least one light assembly 40.

Referring to FIG. 5, in one example, the lighting module 30 is controllable via a control interface 80 which is located remotely from the seat panel 20. In one example, the control interface 80 is located in the vehicle 100 such that the control interface 80 is accessible by a passenger located in the forward seat 10, which may be the driver of the vehicle 100. For example, the control interface 80 can be located in one of the instrument panel, steering wheel, door switch cluster, or other location in vehicle 100 accessible by a forward seat passenger, such that the lighting module 30 can be controlled via from the forward seat 10 of the vehicle 100. This can be advantageous, for example, when the rearward seat assembly 18 is occupied by a passenger 38 who is not able to operate the light switch 42, for example, a younger child constrained by a seat belt or child seat, or when the rearward seat assembly 18 is unoccupied and task lighting is required, for example, to illuminate the floor space 34 and/or the seat space 36 of the vehicle 100.

As shown in FIGS. 2-5 and further referring to FIGS. 6 and 7, in an illustrative example, the seat panel 20 defines at least one aperture 50 which is contained within the recessed space 22, and within the beveled portion 24, such that the light emitted through the at least one aperture 50 forms a light pattern 28 which is directed downward and rearward from the beveled portion 24. The light pattern 28, in the present example, is characterized by a pattern axis 32 which is substantially perpendicular to a bevel plane 84 defined by the beveled portion 24, where, as shown in FIGS. 1, 6 and 7, the bevel plane 84 is inclined to the central axis 26 of the seat back 12 at a bevel angle A. As shown in FIGS. 1, 6 and 7, the light pattern 28 is emitted from the apertures 50 located in the beveled portion 24 such that the seat pocket 46, the leg space 34 and the task space 36 are fully illuminated by the light assemblies 40, however, the light pattern 28 is contained between the floor 16 and a reference plane 88 which extends through the apertures 50 and is substantially parallel to the floor 16. In one example, the reference plane 88 extends through an uppermost edge 90 of the at least one aperture 50. As shown in FIGS. 6 and 7, the light pattern 28 is contained between the reference plane 88 and the floor 16 through the range of inclination of the seat back 12 from a first incline angle C1 to a second incline angle C2. As such, in the present example, the light pattern 28 does not extend beyond the floor and task areas 34, 36 of the passenger 38 within the vehicle, that is, the light pattern 28 is controlled such that it does not extend into the field of vision of a driver of the vehicle 100, another passenger of the vehicle 100, or outward from the vehicle 100, and so that the light pattern 28 is not perceptible by drivers of adjacent vehicles, and/or the contents, including the passengers, of the vehicle 100 are not illuminated for viewing by others outside of the vehicle.

The example configuration shown in FIGS. 2-7 is not intended to be limiting and it would be understood that the lighting module 30 can be configured with various combinations of apertures 50, light assemblies 40, light sources 60, lenses 52, switches 42, and control algorithms, which can be incorporated into the seat panel 20 to provide various light patterns 28 to illuminate one or more of the pocket 46, the floor area 34 and the task are 36 of the vehicle 100. The example of a pocket 46 provided in the recessed space 22 is not intended to be limiting and it would be understood that other configurations of the pocket 46 or a storage space can be provided, or other features, such as a folding, extendable, and/or retractable tray or table can be included in the recessed space 22 for use by a passenger 38 in performing a task.

Figure 8:
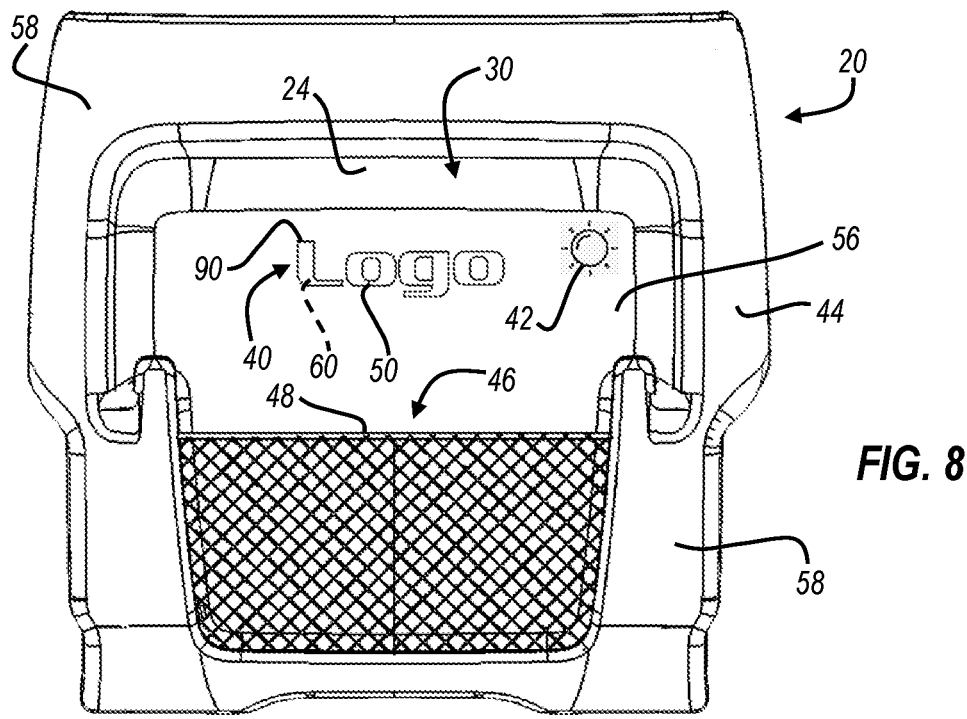
FIG. 8 is another example illuminated seat panel of FIG. 1.

For example, FIG. 8 illustrates an example configuration of a seat panel 20 including one or more apertures 50 formed in the recessed portion 56 to define a decorative shape, which in the present example is configured as a "Logo", which in the example of a vehicle 100, may be the logo of the vehicle brand, make, model, etc., or may be another decorative shape. The aperture 50 and/or the light assembly 40 can be configured such that the light pattern 28 emitted from the lighting module 30 illuminates the pocket 46, the floor area 34 and the task are 36 of the vehicle 100, however does not extend above a reference plane 88 which extends through an uppermost edge 90 of the "Logo" aperture 50. In the example shown, the light switch 42 can be configured as a button or toggle switch which in the present example is located in the recessed portion 56.

Figure 9:
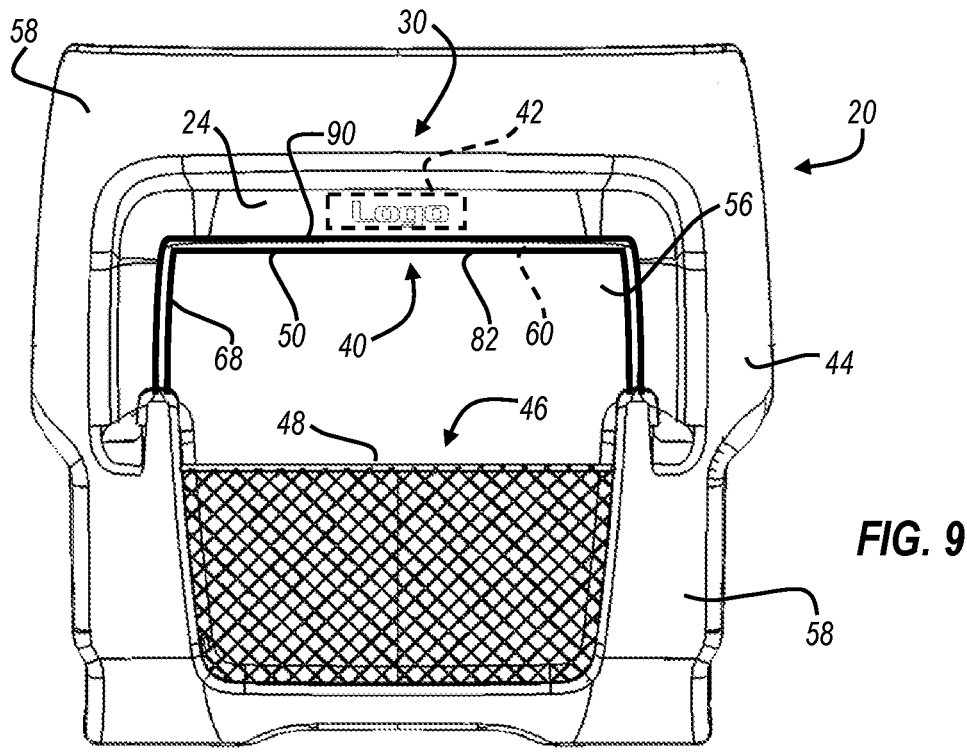
FIG. 9 is another example illuminated seat panel of FIG. 1.

FIG. 9 illustrates another example including a light assembly 40 including a housing 68 which includes a channel 82 formed at the junction of the recessed portion 56 and the beveled portion 24, where the light source 60, in the present example, can be configured as an LED tube or LED strip extending the length of the channel 82. The channel 82, housing 68, the light source 60, and/or the light assembly 40 can be configured, in the present example, such that the light pattern 28 emitted from the lighting module 30 illuminates the pocket 46, the floor area 34 and the task are 36 of the vehicle 100, however does not extend above a reference plane 88 which extends through an uppermost edge 90 of the aperture 50 and/or the light channel 82. In the example shown in FIG. 9, the light switch 42 is a haptic switch integrated into the beveled portion 24 of the seat panel 20, where the location of the switch 42, in the present example, is indicated by a "Logo" or other decorative feature formed into and/or applied to exterior side 44 of the seat panel 20.

The term vehicle 100, as used herein, is not limited to an example such as an automobile having forward and rearward seat assemblies 10, 18. Rather, a vehicle, as that term is used herein, can be configured as any one of an automobile, a truck, a bus, a train, an airplane, a helicopter, a boat, a ship, etc. having a plurality of seat assemblies wherein each seat assembly which is forward of another seat assembly can contain an illuminated seat panel as described herein, for the convenience and use of a passenger positioned in the rearward seat assembly, and/or for lighting of the floor and/or seat areas between the seats of the vehicle.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of 'comprising' and "including" to provide more specific embodiments and are also disclosed. As used in this disclosure and in the appended claims, the singular forms "a", "an", "the", include plural referents unless the context clearly dictates otherwise.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples can be combined with one or a plurality of other desired characteristics from other examples, resulting in other embodiments not described in words or by reference to the drawings. Accordingly, such other embodiments fall within the framework of the scope of the appended claims.

The invention claimed is:

1. A seat panel comprising:
at least one aperture defined by the seat panel;
a recessed space defined by the seat panel;
a perimeter portion;
a beveled portion;
a recessed portion;
wherein the beveled portion is intermediate the perimeter portion and the recessed portion;
wherein the recessed space is defined by the recessed portion and the beveled portion; and
wherein the at least one aperture is located in the recessed portion;
a light assembly;
wherein the light assembly is selectively actuable to emit light through the at least one aperture;
wherein the at least one aperture defines a light pattern of the light emitted by the light assembly; and
wherein the light pattern at least partially illuminates the recessed space.

2. The seat panel of claim 1, further comprising:
a switch in communication with the light assembly;
wherein the switch is selectively actuable to actuate the light assembly.

3. The seat panel of claim 2, wherein:
the switch is a haptic switch; and
the switch is actuable by contact with the seat panel.

4. The seat panel of claim 1, wherein the light assembly includes a light source; and
wherein the light source includes at least one light emitting diode (LED).

5. The seat panel of claim 4, wherein the light source includes at least one of a LED bulb, an LED array, an LED strip, or an LED tube.

6. The seat panel of claim 1, further comprising:
the seat panel installed to a seat configured to be attached to a mounting surface;
wherein, with the seat panel in the installed position relative to the mounting surface, the seat panel defines a plane extending through the at least one aperture;
wherein the plane is substantially parallel to the mounting surface; and
wherein the light pattern is contained between the plane and the mounting surface.

7. The seat panel of claim 6, wherein:
the at least one aperture defines an uppermost edge; and
the plane includes the uppermost edge.

8. The seat panel of claim 1, further comprising:
a control unit in communication with the light assembly;
wherein the control unit is actuable to actuate the light assembly to emit the light pattern.

9. The seat panel of claim 8, wherein the control unit is configured to:
receive power at a first voltage level from a power source; and
output power at a second voltage level to the light assembly.

10. The seat panel of claim 8, wherein when the seat panel is installed to a vehicle including a network in communication with a power source, the control unit is configured to be in communication with the network to receive power from the power source to actuate the light assembly.

11. The seat panel of claim 10, wherein the vehicle includes a control interface located remotely from the seat panel;
wherein the control interface is in communication with the control unit via the network; and
wherein the control interface is actuable to actuate the light assembly.

12. The seat panel of claim 1, wherein when the seat panel is installed to a rearward side of a forward seat assembly of a vehicle including a rearward seat assembly positioned rearward of the forward seat assembly to define a leg space therebetween, the light pattern is configured to illuminate the leg space.

13. The seat panel of claim 12, wherein the rearward seat assembly defines a seat space; and
wherein the light pattern at least partially illuminates the seat space.

14. The seat panel of claim 12, wherein:
the forward seat assembly is mounted to a floor of the vehicle;
the forward seat assembly includes a seat back and a seat portion;
the seat panel is installed to seat back;
the seat back is moveable between a first incline angle and a second incline angle;
wherein with the seat back in the first incline angle the light pattern is contained between a plane and the floor of the vehicle;
wherein the plane is substantially parallel to the floor; and
wherein the plane extends through the at least one aperture.

15. The seat panel of claim 1, wherein the light assembly is selectively actuable to change a color of the light from a first color to at least a second color.

16. The seat panel of claim 1, wherein the light assembly is selectively actuable to change a luminosity of the light from a first luminosity to at least a second luminosity.

17. The seat panel of claim 1, further comprising:
a pocket portion attached to the seat panel;
wherein the pocket portion at least partially encloses the recessed space to define a pocket such that the light pattern at least partially illuminates the pocket.

* * * * *